United States Patent [19]
Norris

[11] Patent Number: 5,966,452
[45] Date of Patent: Oct. 12, 1999

[54] SOUND REDUCTION METHOD AND SYSTEM FOR JET ENGINES

[75] Inventor: Elwood G. Norris, Poway, Calif.

[73] Assignee: American Technology Corporation, Poway, Calif.

[21] Appl. No.: 08/814,717

[22] Filed: Mar. 7, 1997

[51] Int. Cl.[6] .............................. A61F 11/06; H03B 29/00
[52] U.S. Cl. .......................................... 381/71.1; 381/71.8
[58] Field of Search .................................. 381/71.1, 71.2, 381/71.4, 71.7, 71.8, 94.1; 181/206, 210

[56] References Cited

U.S. PATENT DOCUMENTS

| | | |
|---|---|---|
| 3,792,584 | 2/1974 | Klees . |
| 3,936,606 | 2/1976 | Wanke . |
| 5,127,602 | 7/1992 | Batey et al. . |
| 5,363,450 | 11/1994 | Moody . |
| 5,386,689 | 2/1995 | Bozich et al. . |
| 5,402,963 | 4/1995 | Carey et al. . |
| 5,410,607 | 4/1995 | Mason et al. . |
| 5,414,230 | 5/1995 | Nieuwendijk et al. . |
| 5,440,875 | 8/1995 | Torkelson et al. . |
| 5,466,899 | 11/1995 | Geisenberger . |

OTHER PUBLICATIONS

Shirley, Gerald "The Corona Wind Loudspeake" Journal of the Audio Engineering Society, D.M. Tombs, Nature, 176, 923 (1955) pp. 29–37.

*Primary Examiner*—Minsun Oh Harvey
*Attorney, Agent, or Firm*—Thorpe, North & Western, LLP

[57] ABSTRACT

A method and apparatus for reducing acoustic noise waves in the vicinity of an electrically conductive plasma, such as in the exhaust of a gas turbine engine, having a sensor to detect the noise wave and generate a representative electrical noise signal; a signal analyzer to analyze the noise signal, a wave form generator to generate a phase inverted, electrical interference signal based on the noise signal, an amplifier, a time delay, an error corrector; and an applying means to conduct the electrical interference signal to the plasma causing the plasma to generate a pulsating interference wave to cancel the acoustic noise wave.

28 Claims, 4 Drawing Sheets

SOUND REDUCTION METHOD AND SYSTEM FOR JET ENGINES

BACKGROUND OF THE INVENTION

1. Field of the Invention

The present invention relates to a method and system for reducing noise in a jet engine. More particularly, the present invention relates to canceling the acoustic waves produced by a jet engine by stimulating a plasma within the engine to propagate an acoustic interference wave.

2. Prior Art

Jet aircraft are notorious for their excessive noise level. Individuals who reside near airports are continually subjected to high pitch, high volume noise from passing aircraft. Passengers on board the aircraft must also endure the noise for extended periods of time. This noise pollution is uncomfortable and even dangerous to the health of such persons. Accordingly, governmental regulations are in effect which require aircraft to adhere to certain maximum noise levels.

There are essentially three sources of acoustic noise in a gas turbine engine. The primary noise source is the engine exhaust. High velocity exhaust gases exiting the engine produce noise, as well as propagate mechanical noise from the engine. An additional noise source occurs at the air intake because of high speed rotation of the fan and compressor blades. Finally, mechanical engine noise is transmitted through the nacelle structures of the aircraft.

The most common methods for suppressing engine noise involve passive techniques, such as mechanically blocking the noise source with a muffler. Other passive techniques include mechanically blocking noise waves and/or converting the acoustic energy into different energy forms such as heat energy or acoustic waves of different frequencies. These techniques are only marginally effective because they allow the air and exhaust, which generate the noise, to flow freely from the source and then remedially attempt to cover or dissipate the acoustic energy. Similarly, exhaust systems have been developed that create a low velocity exhaust flowstream to surround, and thus block noise from, a high velocity exhaust flow stream. These techniques have had only limited success.

Other methods have focused on more active techniques, such as mixing inlet air with the exhaust gas to reduce the velocity of the exhaust gases. Such bypass systems involve varying the bypass ratio and depend on complex mixers for mixing the bypass air and exhaust gases. One problem with this technique is that it reduces the efficiency of the engine by bleeding intake air from the inlet.

Another active technique involves introducing a fluid, such as water, into the exhaust gases. The fluid is heated by the exhaust gas and expands rapidly. The rapid expansion produces sound and vibrations which are not in phase with the noise and vibrations produced by the engine. This method, however, requires the aircraft to carry a large volume of fluid, increasing the weight of the aircraft.

In theory, near complete suppression of engine noise should be possible with an active technique which cancels the acoustic waves. Such a technique would operate on the principle of wave interference or destructive interference. Methods that attempt to use destructive interference typically use a microphone, a control unit, and a speaker. The microphone senses the acoustic wave to be eliminated and generates an electrical signal that is sent to the controller. The controller inverts the signal and sends it to the speaker, which produces an acoustic wave that is usually 180° out of phase with the original sound wave. The two waves interfere with and cancel one another.

Such techniques have been developed for integration on the exhaust of reciprocating engines and are described in U.S. Pat. Nos. 5,466,899 and 5,414,230. Unfortunately, implementing theoretical interference is usually frustrated by practical realities which limit formation of any ideal, phase inverted acoustic wave. Furthermore, these methods fail to cancel the first half cycle of the wave or the last half cycle. Even if inverse phase alignment were feasible, the two waves must still have symmetrical pressure variations for total cancellation.

A specific example of such a prior art is found in U.S. Pat. No. 3,936,606, issued on Feb. 3, 1976 to Wanke. This patent illustrates a noise suppression system for a gas turbine engine that produces an anti-wave, or phase inverted wave, which is in-phase and of mirror symmetry with respect to the acoustic wave. A microphone detects the acoustic wave. A controller creates a time delayed and phase reversed mirror symmetry signal to generate a phase inverted wave through a speaker. Wanke uses large ducts to channel the acoustic wave and anti-wave in order to create plane waves that can be easily combined to cancel each other. Practical application of this method is limited, however, because of the requirement that waves be directed through a wave guide to convert all the wave energy into plane waves.

Therefore, it would be advantageous to develop a method and apparatus for reducing noise capable of implementation on an aircraft and capable of creating an interference wave propagating in three dimensional space.

OBJECTS AND SUMMARY OF THE INVENTION

It is an object of the present invention to provide a sound reduction method.

It is another object of the present invention to provide a sound reduction system that is capable of implementation on an aircraft.

It is yet another object of the present invention to provide a sound reduction system capable of producing a phase inverted wave to destructively interfere with an acoustic noise wave.

It is a further object of the present invention to provide a sound reduction system capable of creating a phase inverted wave propagating in three dimensional space as opposed to being limited to plane waves.

Still another object of the present invention is to provide a sound reduction system capable of creating a phase inverted wave by stimulating a plasma.

These and other objects and advantages of the present invention are realized in a sensor for detecting acoustic noise waves and generating an electrical signal that is a representation of the noise wave. The sensor is coupled to an analyzer and a wave form generator which convert the electrical signal to an interference signal that is a representation of an interference acoustic wave that will destructively interfere with the noise wave. An amplifier and time delay may be used to strengthen and delay the interference signal. A plasma coupling means applies the interference signal to an electrically conductive plasma created by the hot exhaust gases of the jet engine. The interference signal enables the electrically conductive plasma to generate a pulsating interference wave which destructively interferes with the acoustic waves at the source of origin.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
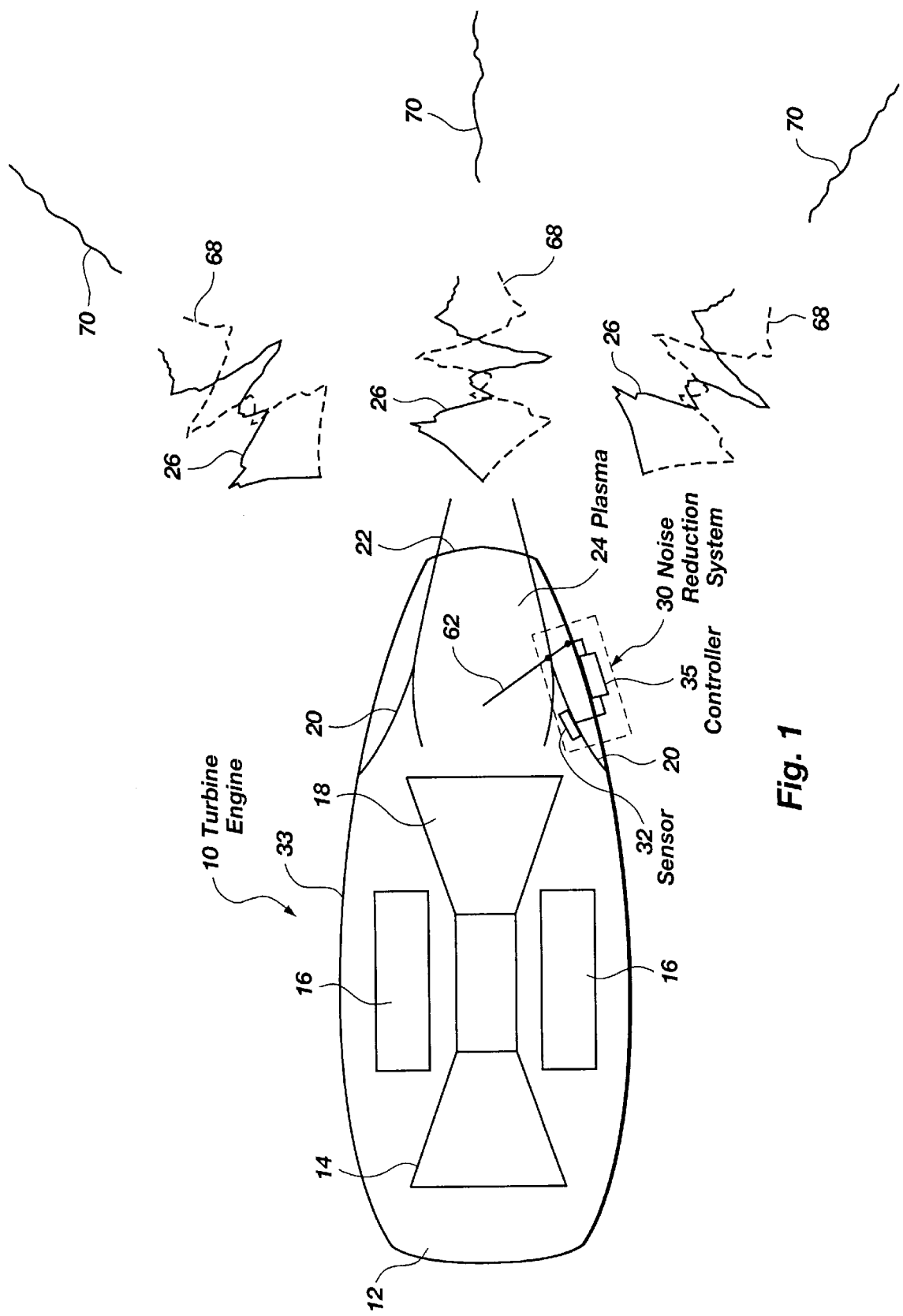
FIG. 1 is an elevational cross-section view of a combustion turbine incorporating a preferred embodiment of the acoustic noise suppression system of the present invention.

As illustrated in FIG. 1, a gas turbine engine 10 is shown with a noise reduction system 30 of the present invention. The engine 10 has an air inlet 12 and a compressor 14 for compressing air as it enters the engine 10. The compressor 14 typically consists of a low pressure compressor and a high pressure compressor. The air is mixed with fuel and combusted in a combustion chamber 16. Expansion of the combusted fuel and air turns a turbine 18 before entering an exhaust duct 20.

The turbine 18 typically consists of a high pressure turbine and a low pressure turbine. The turbine 18 drives the compressor 14. The combusted air and fuel is then expelled through an outlet 22.

Generation of a three-dimensional interference wave is facilitated within the combustion chamber by means of a conductive plasma. As the air and fuel are combusted, a highly ionized gas or plasma 24 is formed. In this state, the gas is heated to very high temperatures and the electrons surrounding the gas atoms are freed from the nucleus. Thus, the heated gas becomes a collection of free electrically charged particles comprising negatively charged electrons and positively charged ions. The plasma 24 is characterized by being electrically conductive.

As previously noted, the exhaust duct 20 or outlet 22 is the primary source of acoustical noise. Acoustical noise waves, represented at 26, are generated in the engine 10 and emitted through the exhaust duct 20 and out the outlet 22.

The noise reduction system 30 of the present invention includes circuitry for generating an electrical noise signal representing the acoustical noise waves. One example of such circuitry is a sensor 32, such as a microphone or pressure transducer, strategically positioned inside of the exhaust duct 20 to detect acoustical noise waves. In the preferred embodiment of the present invention, the sensor 32 is located inside of the exhaust duct 20. The sensor 32 is positioned such that it may detect noise waves within the exhaust duct 20 but be protected from direct contact with the exhaust gases. The sensor 32 may be made of a durable material or covered by a guard to protect it from the high temperature, high velocity exhaust gases. If a guard is used, it should be configured so as not to interfere with the efficiency of the engine.

Figure 2:
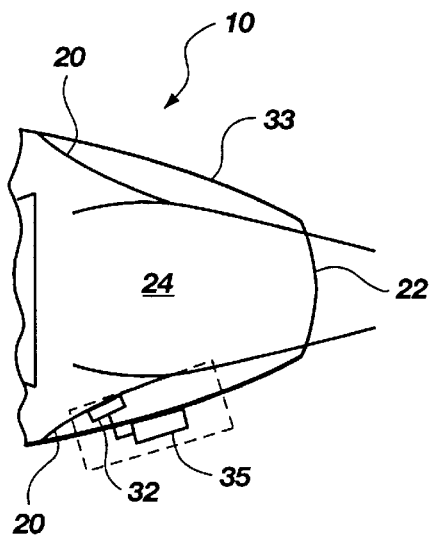
FIG. 2 is an elevational cross-section view of an exhaust duct of a combustion turbine incorporating an alternative embodiment of the acoustic noise suppression system of the present invention.
Figure 3:
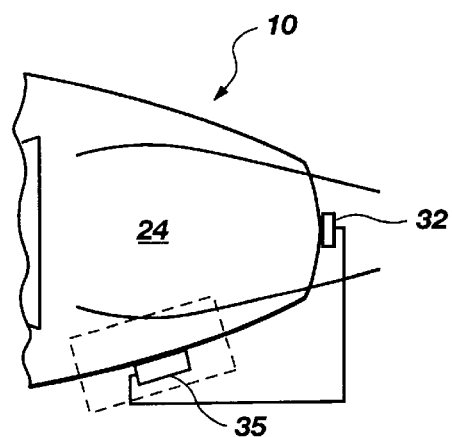
FIG. 3 is an elevational cross-section view of an exhaust duct of a combustion turbine incorporating an additional alternative embodiment of the acoustic noise suppression system of the present invention.
Figure 4:
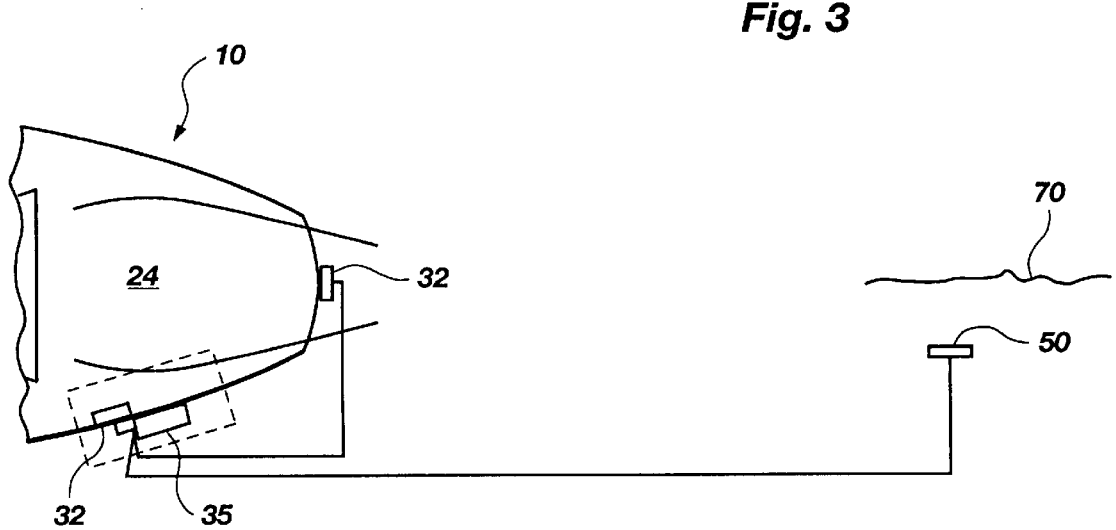
FIG. 4 is an elevational cross-section view of an exhaust duct of a combustion turbine incorporating a further alternative embodiment the acoustic noise suppression system of the present invention.

Alternatively, as shown in FIG. 2, the sensor 32 may be located within the overall engine enclosure 33 but outside of the exhaust duct 20. This configuration has the advantage of protecting the sensor 32 from the exhaust gases. In addition, as shown in FIG. 3, the sensor 32 may be located at the outlet 22 of the engine 10. This configuration has the advantage of positioning the sensor where the noise waves emanate from the engine. It is important that the sensor 32 be positioned so that it may best detect the noise waves without being destroyed by the exhaust. It is of course understood that any number of sensors could be advantageously located at positions within the engine or outside the engine, as shown in FIG. 4.

Figure 5:
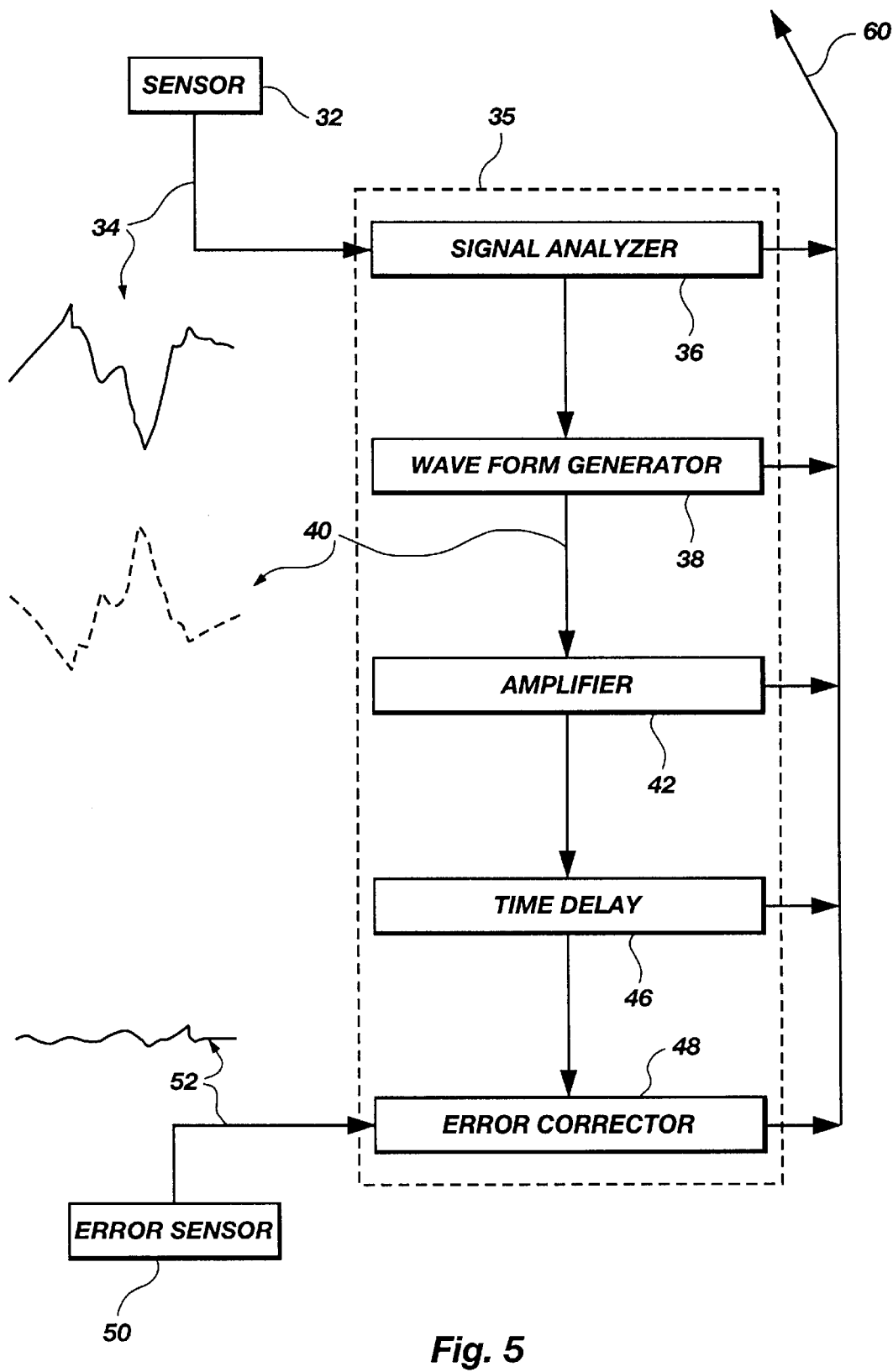
FIG. 5 is a schematic of a preferred embodiment of the acoustic noise suppression system of the present invention.

As illustrated in FIG. 5, the sensor 32 generates an electrical noise signal 34 corresponding to the detected acoustical noise waves in the exhaust duct 20 that is a representation of the noise waves. The noise signal 34 is transmitted from the sensor 32 to a controller 35 to be processed. The controller 35 may comprise various functions such as signal analysis, wave form generation, amplification, time delay, and error correction. It is of course understood that the signal representing the noise waves may be a digital or analog signal and may be transmitted either electrically or by fiber optics.

In the preferred embodiment, the sensor 32 is electrically connected to, or otherwise in communication with, a signal analyzer 36 which receives the noise signal 34 from the sensor 32. The analyzer 36 analyses the noise signal 34.

The noise signal 34 is transmitted from the signal analyzer 36 to a wave form generator 38 that is electrically coupled to the signal analyzer 36. The wave form generator 38 generates an interference signal 40 that is phase inverted from the noise signal. It is important to note that the signal is preferably phase inverted rather than phase shifted. A phase inverted signal is inverted about the axis of zero amplitude such that the valleys of the inverted signal are a mirror image of the peaks of the original signal. For example, if the sensor detected a complex, nonsymetrical, acoustic noise wave, the wave form generator would create a phase inverted signal that was the inverse of, or a mirror image of, the original signal. A phase inverted wave corresponding to the phase inverted signal will destructively interfere with the noise wave.

An amplifier 42 may be used to create an increased amplitude, phase inverted, interference signal such that the signal has sufficient electrical magnitude to stimulate the plasma 24. The interference signal 40 is transmitted to the amplifier 42 that is electrically coupled to the wave form generator 38. In addition, because acoustic waves propagate at the speed of sound and the electrical signal may travel much faster, it may be necessary to incorporate a time delay 46. The amplified interference signal is transmitted to the time delay 46 that is electrically coupled to the amplifier 42.

Furthermore, an error corrector 48 may also be included to further correct the interference signal 70. As shown in FIG. 4, an error sensor 50 may be located outside of the engine, for example, on the tail or rear body of the aircraft. This error sensor 50 would detect the resulting acoustic wave 70 and generate an electrical error signal 52 based on the resulting acoustic wave 70. The interference signal 40 would then be modified by the error corrector 48 to compensate for acoustic noise waves not previously reduced.

The interference signal 40 is transmitted to a plasma coupling means 60 that is electrically coupled to the controller 35. The plasma coupling means 60 applies the phase inverted, interference signal 40 to the plasma 24.

In the preferred embodiment, the plasma coupling means 60 is a rod 62 extending into the exhaust duct 20, as shown in FIG. 1. The rod 62 is fastened to the inner surface of the exhaust duct 20. The rod 62 is electrically conductive and made of a material that can withstand the high temperature, high velocity exhaust gases.

Figure 6:
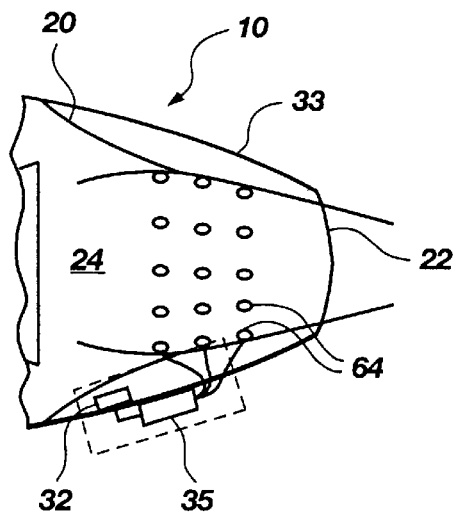
FIG. 6 is an elevational cross-section view of an exhaust duct of a combustion turbine incorporating an alternative embodiment of the acoustic noise suppression system of the present invention.
Figure 7:
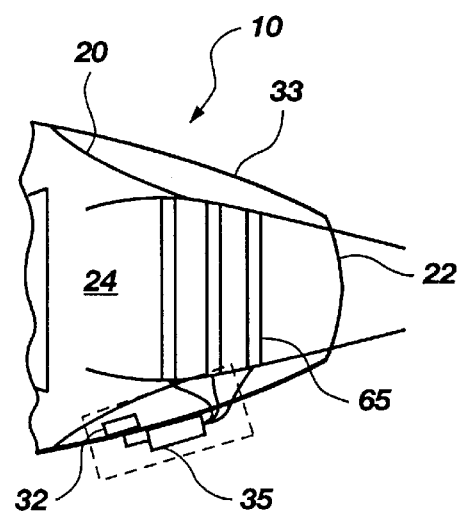
FIG. 7 is an elevational cross-section view of an exhaust duct of a combustion turbine incorporating an alternative embodiment of the acoustic noise suppression system of the present invention.

Alternatively, as illustrated in FIG. 6, the coupling means 60 may be an electrode 64 or plurality of electrodes on the inner walls of the exhaust duct 20. The electrode may be a strip or ring 65 on the inner surface of the exhaust duct and encircling the exhaust gases, as shown in FIG. 7. It is of course understood that the coupling means may comprise any number of rods or electrodes for conducting the phase inverted signal to the plasma 24.

Figure 8:
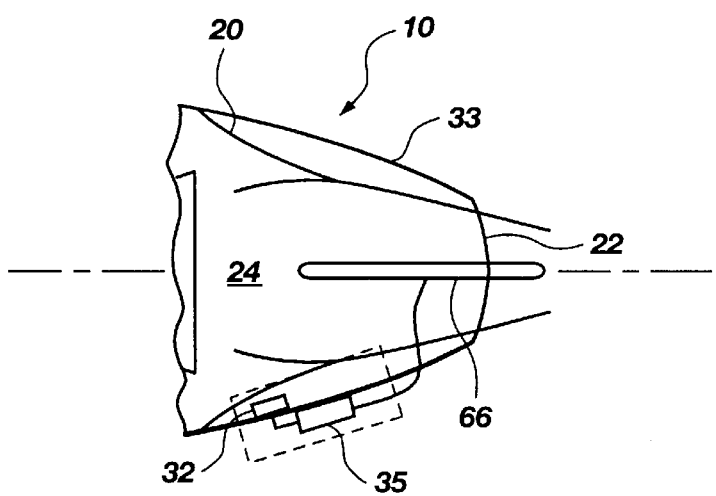
FIG. 8 is an elevational cross-section view of an exhaust duct of a combustion turbine incorporating an alternative embodiment of the acoustic noise suppression system of the present invention.

Alternatively, the applying means 60 may be an antenna 66 positioned and oriented collinear with the flow of exhaust gases, as shown in FIG. 8.

Alternatively, the applying means may be located at the outlet 22 of the engine 10.

It will be apparent that the electrical interference signal will only be effective if the phase inverted component can be timely transferred to the plasma region so that the plasma generates a physical compression wave for canceling the undesired jet engine compression waves. This aspect is referred to as a sound generating means associated with the electrical interference signal 40. The interference signal 40 may be a variable digital or analog signal output from the controller 35. The sound generating aspect may include a voltage output associated with the interference signal 40 that effects the electrical state of the plasma. One possible mechanism for pulsating the plasma depends on a voltage applied to the plasma which causes a change in electrical charge density. The change in charge density is accompanied by a change in the physical density and physical dimensions of the plasma. Thus, applying a voltage charge to the plasma causes it to expand or contract. As the plasma expands, a pressure wave is created. As the plasma contracts, a void is created. The expansion and contraction of the plasma creates a pulsating interference wave 68, as shown in FIG. 1. Because the interference wave 68 is phase inverted from the original noise signal 34, the interference wave 68 produced by the plasma interferes in a destructive way with the acoustic noise wave 26.

The interference wave 68 generated by the electrically stimulated plasma 24 is characterized by being in-phase and of mirror symmetry with respect to the acoustic noise wave 26 produced by the engine 10. In accordance with the principles of wave interference or destructive interference, the interference wave 68 combines with the acoustic noise wave 26 to form a resulting acoustic wave 70 of lesser noise level. The result is that the interference wave 68 substantially cancels the acoustic noise wave 26.

If the plasma state 24 is not sufficiently realized in the exhaust duct 20, it may be necessary to augment plasma formation by further heating the exhaust gases to overcome the dielectric property of the exhaust. The exhaust gases may also be seeded with a conductive material to increase the conductivity of the exhaust gases. Numerous seeding techniques may be applied such as spraying the conductive material into the combustion chamber or the exhaust duct. The conductive material may be salt or salt crystals. The presence of ionic salt increases the conductivity of the exhaust gases and reduces the temperature required for obtaining an electrically conductive plasma.

One of the many problems associated with prior art attempts at sound cancellation has been the inadequacy of plane waves formed in the various applied processes. Specifically, some prior art systems incorporated large duct structures to form plane waves in order to initiate destructive interference. In reality, however, sound waves propagate equally in all directions, rather than in a singular, linear direction. The elaborate and large duct structures of the prior art methods have not been practical for gas turbine engines because of the planar nature of resulting waves, as well as limited space and drag restrictions on the aircraft itself.

An advantage of the present invention is that plasma 24 is three dimensional. As the plasma 24 expands and contracts, due to the stimulation of the electrically charged interference signal 40, it does so in three dimensions. Therefore, the produced interference wave 68 is not limited to a plane wave, but propagates in three dimensions like the acoustic noise wave 26 it is designed to eliminate.

Although the present invention has been described with particular reference and by example to a gas turbine engine on an aircraft, it is of course understood that the present invention may be applied to a gas turbine engine in any application or to any system forming a plasma or other expandible conductive medium.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. An apparatus for canceling acoustic noise waves in a plasma which is vicinity of plasma which is an electrically conductive, expandable medium, said apparatus comprising:

circuitry for generating an electrical noise signal representing said acoustic noise waves;

a controller electrically coupled to said circuitry for generating said electrical noise signal representing said acoustic waves for generating an electrical interference signal based on said electrical noise signal, said electrical interference signal being substantially phase inverted from said electrical noise signal to enable wave cancellation;

a plasma coupling means electrically coupled to said controller for applying said electrical interference signal to said electrically conductive plasma; and a sound generating means associated with said electrical interference signal for enabling said electrically conductive plasma to generate a pulsating interference wave, thereby substantially canceling said acoustic noise waves.

2. An apparatus according to claim 1, said apparatus further comprising:

a gas turbine engine which collectively houses the sensor, controller and plasma coupling means.

3. An apparatus according to claim 1, wherein said controller includes a signal analyzer coupled to the sensor.

4. An apparatus according to claim 1, wherein said controller includes a wave form generator.

5. An apparatus according to claim 1, wherein said controller includes an amplifier for increasing the amplitude of the electrical interference signal.

6. An apparatus according to claim 1, wherein said controller includes a time delay for delaying the electrical interference signal for synchronization of the interference waves with the acoustic noise waves.

7. An apparatus according to claim 1, wherein said controller includes an error controller and an error sensor for modifying the electrical interference signal.

8. An apparatus according to claim 1, wherein said circuitry for generating an electrical noise signal includes a plurality of sensors.

9. An apparatus according to claim 1, wherein said coupling means includes an electrode.

10. An apparatus according to claim 1, wherein said coupling means includes a conductive rod.

11. An apparatus according to claim 1, wherein said coupling means includes an antenna positioned and oriented collinear with said exhaust gases.

12. An apparatus according to claim 1, said apparatus further comprising:

a plasma forming means for forming a conductive, expandible gas medium.

13. An apparatus according to claim 1, wherein said sound generating means is a variable voltage applied to the plasma causing the plasma to expand and contract in response to variations of voltage level.

14. An apparatus for canceling acoustic noise waves in a plasma which is vicinity of a plasma which is an electrically conductive, expandible medium, said apparatus comprising:

a compartment;

a plasma forming means coupled to the compartment for forming a plasma in said compartment;

a sensor for detecting said acoustic noise waves, said sensor generating an electrical noise signal representing said acoustic noise waves;

a controller electrically coupled to said sensor for generating an electrical interference signal based on said electrical noise signal, said electrical interference signal being at least phase inverted from said electrical noise signal; and a plasma coupling means electrically coupled to said controller for applying said electrical interference signal to said electrically conductive plasma; and a sound generating means associated with said electrical interference signal for enabling said electrically conductive plasma to generate a pulsating interference wave, thereby substantially canceling said acoustic noise waves.

15. An apparatus according to claim 14, wherein said acoustic noise waves are generated by said plasma forming means in said compartment.

16. An apparatus according to claim 14, wherein said compartment is a gas turbine engine.

17. An apparatus according to claim 14, wherein said plasma forming means is a gas turbine engine.

18. An apparatus according to claim 14, wherein said controller includes a signal analyzer.

19. An apparatus according to claim 14, wherein said controller includes a wave form generator.

20. An apparatus according to claim 14, wherein said controller includes an amplifier for increasing the amplitude of the electrical interference signal.

21. An apparatus according to claim 14, wherein said controller includes a time delay for delaying the electrical interference signal for synchronization of the interference waves with the acoustic noise waves.

22. An apparatus according to claim 14, wherein said controller includes a error controller.

23. An apparatus according to claim 14, wherein said sensor includes a plurality of sensors.

24. An apparatus according to claim 14, wherein said applying means includes an electrode.

25. An apparatus according to claim 14, wherein said applying means includes a conductive rod.

26. An apparatus according to claim 14, wherein said sound generating means is a variable voltage applied to the plasma causing the plasma to expand and contract in response to variations of voltage level.

27. A method for canceling acoustic waves in a plasma which is a vicinity of a plasma which is an electrically conductive, expandible medium, said method comprising the steps of:

(a) sensing said acoustic noise waves;

(b) generating an electrical noise signal representing said acoustic noise waves;

(c) generating an electrical interference signal based on said electrical noise signal, said electrical interference signal being at least phase inverted from said electrical noise signal;

(d) applying said electrical interference signal to said electrically conductive plasma; and (e) generating an interference wave with said electrically conductive plasma, thereby substantially canceling said acoustic noise waves.

28. A method according to claim 27, further comprising the step of forming a plasma.

* * * * *